Nov. 13, 1962 C. H. SIMPSON 3,063,817
PROCESS FOR EXTRACTING SULPHUR FROM MATERIAL
CONTAINING ELEMENTAL SULPHUR
Filed Feb. 7, 1958
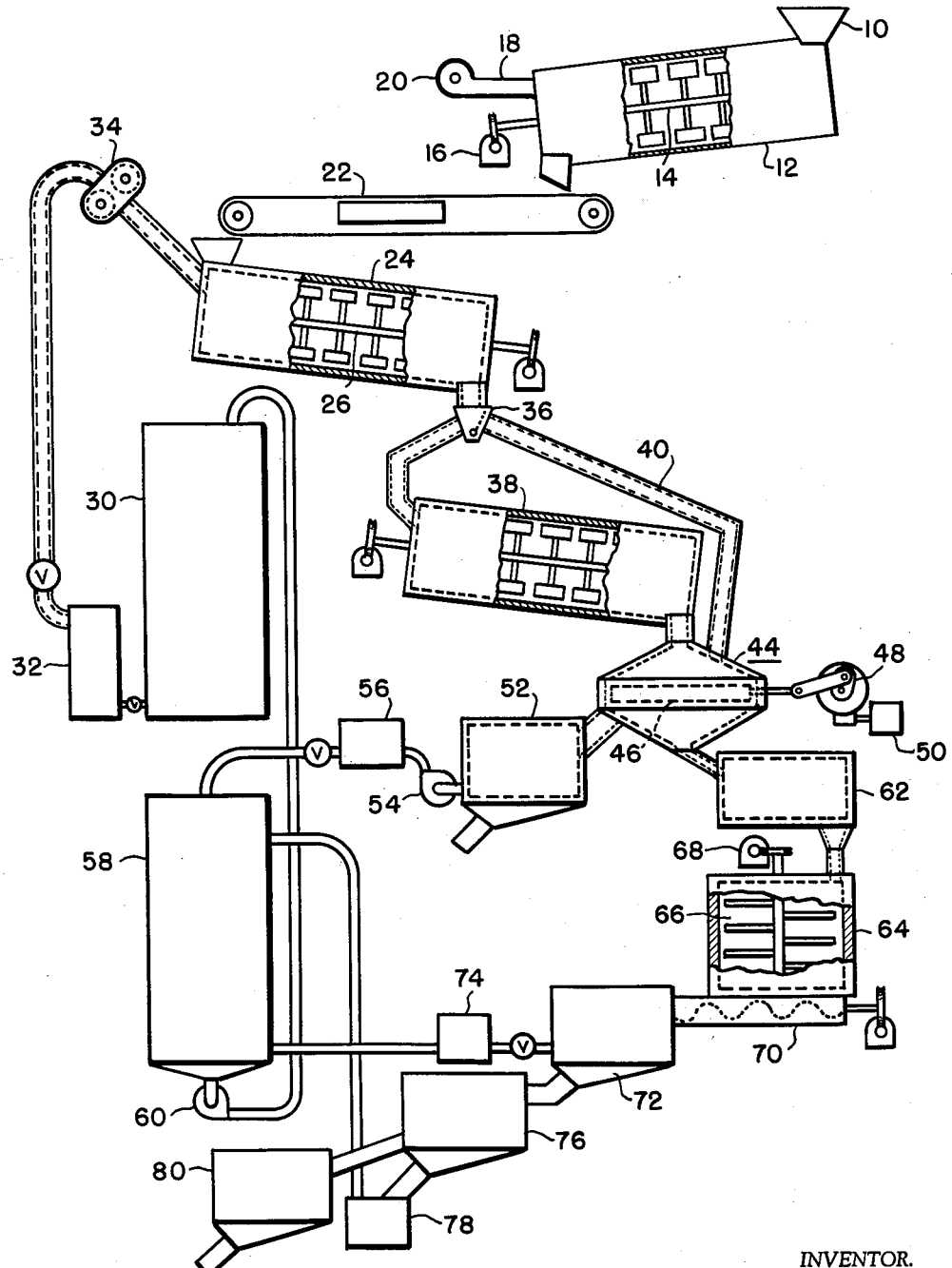
INVENTOR.
*Charles H. Simpson*
BY Webb, Mackey + Burden
HIS ATTORNEYS 3,063,817
PROCESS FOR EXTRACTING SULPHUR FROM MATERIAL CONTAINING ELEMENTAL SULPHUR
Charles H. Simpson, 302 S. Negley Ave.,
Pittsburgh 32, Pa.
Filed Feb. 7, 1958, Ser. No. 713,835
12 Claims. (Cl. 23—312)

This invention relates to a process for extracting sulphur from material containing elemental sulphur. Since elemental sulphur occurs in substantial quantities in a number of materials, an economic method for its extraction therefrom is highly desirable. Among elemental sulphur bearing materials having substantial amounts of the sulphur are various low grade ores, tailings from smelter operations, residues produced from precipitation of solids from stack gases and spent oxides from gas works.

Heretofore, attempts to recover the elemental sulphur from these materials have comprised treating the material with a hot selective solvent for the sulphur, separating the residual solid material from a resulting liquor or sulphur solution, and either chilling to 30° C. or lower or evaporating the sulphur solution to separate the sulphur therefrom. Some of the solvents tried have included toluene, xylene, alkyl naphthalenes, tetralin, Decalin, carbon tetrachloride, carbon disulphide, acetylene tetrachloride, tetrachloroethylene, trichlorbenzene, and the like. These attempts have been unsuccessful for various reasons. In the first place, reaction conditions used have been such that the solvent reacted with the sulphur to form sulfurous acid and other acidic substances which corrode apparatus and equipment. The solvent has also reacted with the sulphur to form black tarry substances which foul the apparatus and which solidify on parts thereof, thereby requiring frequent plant shutdowns for its removal. These tarry substances are extremely difficult to remove.

In the second place, the processes have not been adaptable to continuous operation.

In the third place, the processes have been uneconomical for extraction rates have been slow and yields of sulphur low.

In the fourth place, the quality of the extracted sulphur has been inferior.

In the fifth place, the solvent has become contaminated with impurities after being used once or twice and thus requires treatment for removal of impurities before it can be again used.

In the sixth place, the solvents employed have not been sufficiently selective to extract major proportions of the sulphur from the sulphur bearing material without also extracting along with the sulphur, undesirable contaminants in undesirable quantities. This has been particularly true in the case of treatment of spent oxides which contain the following undesirable contaminants which have been extracted by the solvent along with the sulphur: arsenic sulphide, Prussian blue, and certain tar and solvent oils.

My process economically extracts elemental sulphur from such sulphur bearing materials such as low grade ores, tailings from smelter operations, residues from precipitation of solids from stack gases, and spent oxides from gas operations. The elemental sulphur extracted by my process has a very high purity of the order of 99% or more and the yield of the sulphur from the sulphur bearing material is in amounts up to 98% of the elemental sulphur in the material. Specifically, my process comprises forming a mixture of the sulphur bearing material and of an aliphatic hydrocarbon solvent which has from 7 to 18 carbon atoms. Prior to forming the mixture, sulphur bearing material has been dried so that its moisture content is less than about 12% by weight. Extraction of the elemental sulphur from the material is carried out by bringing the mixture to a temperature of between 85° C. and 132° C. and by forming a solution of the solvent and of the elemental sulphur. Next, the solution is separated from residual solid material and cooled to a sulphur crystallizing temperature. Following this, the sulphur which has crystallized is separated from the cooled solvent.

Some of the sulphur bearing material used in practicing my process is in the form of chunks which are reduced by crushing to small pieces which will pass through ⅛ to ¼" screen. Crushing the chunks into small pieces effects increased yields of sulphur from the material by providing better mixing of the material and the solvent and thus, enhancing removal of the sulphur from the material.

After the material has been crushed to about ⅛ to ¼" size, it is dried to remove moisture and thus avoid undesirable side reactions among the moisture in the material, the sulphur in the solvent, and certain constituents in the material such as mercuric sulfide, chromium compounds, manganese compounds, or water soluble salts. Drying is carried on to reduce the moisture content of the material to less than about 12% by weight. When the moisture content is thus lowered to less than about 12% by weight, likelihood of the undesirable side reactions is not present and the equipment and apparatus used for sulphur removal is not subjected to attack from acidic sulfurous compounds. Thus, the apparatus avoids corrosion from the sulfurous compounds and fouling up of its components and also is not subjected to tarry substances which also foul up and clog the apparatus.

Simultaneously, with drying the material to lower its moisture content to the desired level, I preheat the material to a temperature below the melting point of sulphur; i.e., 112° C.–114° C. and preferably, to a temperature in the range of 85° C.–110° C. It is important that in preheating the material the temperature is not raised to the melting point or above the melting point of sulphur, otherwise the sulphur in the material will melt and flow therefrom and then solidify, thereby causing handling difficulties and clogging and fouling up the apparatus. Preheating the sulphur bearing material avoids chilling the solvent which is heated when it is brought into contact therewith and thereby decreases extraction time. Preheating the sulphur bearing material also prevents the heated solvent from sealing in the material a substantial part of the elemental sulphur until the mixture of solvent and sulphur bearing material is raised to a temperature in excess of the melting point of sulphur and up to 132° C.

Next, I mix the dried and preheated sulphur bearing material with an open chain hydrocarbon solvent having from 7 to 18 carbon atoms. Open chain hydrocarbon solvents of less than 7 carbon atoms are not normally used for extraction of sulphur because they remove unwanted foreign materials and readily react with the sulphur and those of more than 18 carbon atoms are not readily separable from the extracted sulphur.

The open chain hydrocarbon solvents to which my process relates include olefinic and paraffinic solvents. Among the paraffinic hydrocarbon solvents are the heptanes, octanes, nonanes, decanes, undecanes, dodecanes, tridecanes, tetradecanes, pentadecanes, hexadecanes, and octadecanes. Among the olefinic solvents are heptenes, octenes, nonenes, decenes, undecenes, dodecenes, tridecenes, tetradecenes, pentadecenes, hexadecenes and octadecenes.

I employ these open chain hydrocarbon solvents singly or in admixture with each other. Commercially they are readily available as mixtures such as gasoline, naphtha fractions having 7 to 18 carbon atoms, kerosene, diesel oil and stove oil. Open chain hydrocarbon solvents composed predominantly of 7 to 18 carbon atom solvents are useful in practicing my process for commercial solvents produced in the fractionation of petroleum, overlap one another and contain relatively small proportions of hydrocarbons having less than 7 carbon atoms and/or more than 18 carbon atoms.

The amount of solvent added to the sulphur bearing material must be sufficient to extract the sulphur therefrom and to carry it into the solution formed in the extraction step. I have found that a ratio of solvent to material of 1–5:1 by weight produces satisfactory results and that a ratio of 2–4:1 by weight is preferable. Factors which affect the amount of solvent employed are the temperature at which the extraction is carried out and the amount of sulphur in the material.

Before adding the solvent to the preheated material, I heat it to a temperature from 85° C. to 132° C. and thus form a mixture of heated solvent and heated sulphur bearing material. However, it is not necessary in practicing my process that both the solvent and the sulphur bearing material be heated prior to mixing. Heating only the solvent or heating only the sulphur bearing material brings about satisfactory results. However, extraction time is necessarily increased when only one of the solvent and of the sulphur bearing material is preheated. Where both the solvent and the material are preheated, extraction time is completed in 5 to 15 minutes with excellent yields from the material including good yields within 5 minutes. Thus, by preheating both the solvent and the material, my process is easily adaptable to continuous operations. Where either the solvent alone or the material alone is preheated before mixing, extraction time is increased to from 15 minutes to about one hour.

Next, I mix the solvent and the sulphur bearing material together and extract the sulphur from the material at a temperature range of between 85° C. and 132° C. and preferably at a temperature range of 120° C. to 130° C. The upper limit, namely, 132° C. of the temperature range is extremely important as will be described more fully hereinafter. If the temperature is below 85° C. for the extraction step, then the extraction rate is too low to be practical and economical. Where the temperature of the extraction is above 132° C., two highly undesirable and unwanted things occur. The first is that the sulphur commences to react with the hydrocarbon solvent and removes hydrogen atoms from the carbon chain with the result of forming unsaturated products, carbonaceous residues, and hydrogen sulfide. Presence of these reaction products is evident from a darkening of the solvent and in other ways. Hydrogen sulfide is particularly undesirable for even in small amounts, it has a cumulative poison effect and is clearly unwanted in a processing operation. Furthermore, hydrogen sulfide oxidizes to form sulfurous acid and eventually becomes sulfuric acid, each of which is corrosive to metal parts of components of the processing equipment.

With formation of hydrogen sulfide, a reducing agent, and with the presence of other sulphur compounds which can be reduced and which may be present when there is a breakdown or reaction of the hydrocarbon solvent, there is an opportunity for formation of a number of sulphur oxygen compounds such as hydrosulfite, thiosulfate, tetrathionate, and others which generate unexpected difficulties in carrying out my process. In addition, production of the sulphur oxygen compounds materially reduces efficicency of the process and renders recycling of the solvent impossible unless it is purified or treated. Purification or treatment of the solvent to place it in condition for reuse requires the addition of an uneconomical step to the process.

The second unwanted and undesirable thing arising from carrying out extraction of the sulphur at a temperature in excess of 132° C. is production of a liquid sulphur which is not absorbed by the solvent and/or which is insoluble in the solvent. While it would seem logical to employ temperatures in excess of 132° C., particularly 135° C. and higher, to speed up extraction of sulphur and to increase solvent action, I have found that this is not the case because at temperatures of 135° C. and higher, liquid sulphur issues from the material and is not absorbed by the solvent but quickly falls through the solvent to lower parts of the apparatus. Then this liquid sulphur collects in pools in the lower and bottom parts of the apparatus. It does not dissolve in the solvent but travels to a part of the apparatus where it solidifies, becomes hard, and adheres tenaciously to the surface on which it solidifies. Accordingly, this liquid sulphur soon clogs and fouls up the apparatus and reduces operation efficiency or causes a stoppage of the process.

Even though the amount of this liquid sulphur is small, in a continuous operation to which my process is particularly adapted, there is an accumulation of the liquid sulphur which solidifies and interferes with the process.

This liquid sulphur has a high specific gravity relative to the solvent and accordingly, quickly falls through the solvent to lower parts of the apparatus.

Based upon my work in sulphur extraction, it is my opinion that this liquid sulphur which I have found occurs in the extraction step at temperatures of 135° C. and higher comprises an amorphous sulphur designated $S_\mu$ and some impurities. $S_\mu$ is insoluble in carbon disulphide and changes into rhombic or monoclinic sulphur, depending upon the temperature at which it is maintained.

This $S_\mu$, I have found, generally collects on filter screens which are commonly used in the sulphur extraction process and there solidifies and interferes with the entire process. The $S_\mu$ adheres tenaciously to a surface upon which it solidifies and is very difficult to remove from the surface. Where the sulphur extraction apparatus employs tubes or conduits, this $S_\mu$ builds up on the inner walls of the tubes or conduits and thereby decreases the amount of fluid flowing therethrough and eventually prevents any flow or fluid therethrough. Accordingly, in extracting sulphur from sulphur bearing materials, it is critical that the extraction temperature be maintained below that temperature at which this insoluble liquid sulphur, together with impurities from the sulphur bearing material, forms in amounts which coagulate and fall through the solvent to the lower parts of the apparatus and there solidify and foul and clog the equipment.

Duration of the extraction step varies and depends upon factors such as the particular solvent employed, the temperature at which the extraction is carried out, particle size of the sulphur bearing material, and other factors.

Following extraction of the sulphur from the sulphur bearing material, the hot mixture of the sulphur solution and the residual solid material are separated from one another by filter filtration or decantation. Then the hot sulphur solution is cooled sufficiently to precipitate the sulphur and preferably is cooled to about 90° C. Next, it is passed through a filter which removes a major portion of the sulphur, namely, 80 to 90% of the sulphur. This precipitated sulphur is crystalline, has a good color and a purity of 98–99%.

Drying and washing of the filtered sulphur with a suitable substance such as gasoline removes traces of the residual solvent clinging to the sulphur. Heating of the treated sulphur also removes traces of the residual solvent. The separated solvent is then recycled and is used for removal of sulphur from an additional batch of sulphur bearing material.

An accompanying flow diagram shows one way of practicing my process wherein the sulphur bearing material is delivered into a hopper 10 which feeds a kiln or drier 12. The kiln 12 has an agitator 14 driven by a motor 16 and a fan 20 blows hot air or an inert gas through a conduit 18 into and through the kiln 12. The kiln performs two functions, the first being reducing the moisture content of the material to the desired level, and the second being preheating the material to a temperature between 85° C. and 110° C.

From the kiln 12, the dried and preheated sulphur bearing material travels onto an endless weighing belt 22 which in turn feeds the material into a jacketed, heated, extraction vessel 24 which also contains a motor driven agitator 26. From a storage tank 30, the solvent passes through a preheater 32 and then through a metering pump 34 to the extraction vessel 24 where it is mixed in a pre-selected ratio by weight of solvent to sulphur bearing material with the sulphur bearing material. The temperature of the solvent flowing into the extraction vessel 24 is between 85° C. and 132° C.

Mixing of the sulphur bearing material and the solvent for extraction of the sulphur forms an effluent in the extractor 24 which effluent is heated to and maintained at a temperature between 85° C. and 132° C. and preferably, between 120° C. and 132° C. This effluent comprises a mixture of a solution of sulphur in the solvent and of the residual solid material from which the sulphur has been removed. The effluent passes to a valve 36 which directs it to a second extraction vessel 38 of similar construction to the extraction vessel 24, where further sulphur extraction takes place. Then the effluent travels to the jacketed, vibrating screen assembly 44. In the event no further sulphur extraction is needed, the valve 36 directs the effluent through a conduit 40 to the screen assembly 44. This assembly comprises vibrating screens 46 driven by an eccentric 48, coupled to a motor 50.

Where the sulphur bearing material has an excessive amount of fines, I substitute a jacketed wet grinding unit (not shown) for the extraction vessel 24 and form therein a slurry of solvent and sulphur bearing material. Formation of the slurry effects partial removal of the sulphur. The slurry is conveyed to the second extraction vessel 38 which completes recovery of the sulphur from the material.

The screen assembly 44 processes the effluent and separates the hot sulphur solution from the residual solid material by passing the effluent over the screens 46. The solid residual material is discharged from the screen assembly 44 into a solvent recovery unit 52 from which the recovered solvent is conveyed by a pump 54 through a solvent cleaning filter 56 into a surge tank 58. From the surge tank 58, the solvent is conveyed by a pump 60 back to the storage tank 30 for recycling.

The hot sulphur solution passes from the bottom of the screen assembly 44 into a cleaning filter 62 which separates the hot solution from any suspended solid material which is present. The filtered sulphur solution then flows into a jacketed, cooled, precipitating tank 64 having an agitator 66 driven by a motor 68. As the sulphur solution passes through this precipitating tank, it is chilled to a temperature of about 90° C. at which temperature the sulphur crystallizes out from the solution and forms a slurry of sulphur and solvent.

The slurry passes into a screw pipe 70 which conveys it into a filter 72 wherein most of the solvent is separated from the solid sulphur. The separated solvent then flows from the filter 72 through a cleaning filter 74 into the surge tank 58.

The solid sulphur next passes to a second filtering unit 76 which removes most of the residual solvent adhering to the sulphur. The removed solvent then goes into a second cleaning filter 78 and is returned to the surge tank 58 where it is combined with other solvent and then sent back to the storage tank 30.

The solid sulphur is transferred from the filter 76 to a drier 80 where the last traces of solvent are removed therefrom. Thus, the product of the solid sulphur in the drier 80 has a purity of 99.9% and higher and, therefore, qualifies for commercially chemically pure sulphur.

The following examples illustrate the advantages of my process and point out the criticality of the upper temperature of 132° C. for the extraction step.

*Example 1*

One part of spent oxides of gas works by weight was mixed with two parts by weight of stove oil boiling between 150° C. and 250° C. and the resulting mixture was heated to a temperature of 100° C. The mixture was maintained at 100° C. for 30 minutes and then filtered to remove residual solid material.

Filtration of the mixture produced a hot clear filtrate which was cooled to a temperature of about 70° C. following which sulphur crystallized out. The crystallized sulphur was removed from the separated filtrate by filtration. Sulphur obtained had good color and melted at 112° C.

The yield of the crystallized sulphur was 33% by weight of the original spent oxide.

An analysis of the crystallized sulphur which was not treated with gasoline to remove oils and tars and residual traces of the stove oil is as follows:

| | Percent by weight |
|---|---|
| Total sulphur (S) | 97.8 |
| Ash (essentially $Fe_2O_3$) | 0.13 |
| Oils and Tars | 0.11 |
| Arsenic | Nil |
| Ferrocyanide | Nil |

The ash can be removed by gravity separation after drying of the sulphur.

The separated stove oil solvent had substantially its original color and was substantially free from impurities; thus, could be used again in the extraction of a further quantity of spent oxides.

*Example 2*

One part by weight of sulphur bearing ore at room temperature having a sulphur content of 31.8% and a moisture content of less than 12% was placed in a container and immersed in three parts by weight of kerosene heated to a temperature between 125° C. and 130° C. The mixture was held at a temperature between 125° C. and 130° C. until substantially all of the sulphur was separated from the ore. This required approximately 15 minutes. During the extraction of sulphur, no evolution of hydrogen sulfide was detected, nor was there any evidence of a chemical reaction between the sulphur and the kerosene.

The sulphur was completely dissolved in the kerosene and there was no evidence of insoluble molten sulphur in the vessel. Upon separation of the solid residual ore by filtration of the solution and cooling thereof, a pure crystalline sulphur precipitated with a yield of approximately 98% of the sulphur in the ore. The separated solvent kerosene was substantially clear and colorless and, therefore, could be used in further practice of my process. The sulphur obtained had a purity of 99.9% or higher.

*Example 3*

One part by weight of sulphur bearing ore having a sulphur content of 31.8% sulphur and a moisture content of less than 12% was heated between 90° C. and 100° C. This heated ore was placed in a perforated container and immersed in three parts by weight of a commercial kerosene which was heated to a temperature of 125° C. to 130° C. In slightly less than 5 minutes, extraction of the elemental sulphur from the sulphur bearing ore was completed, and the mixture of sulphur solution and the solid residual ore was filtered to remove the solution from the solid residual ore. Next, the sulphur solution was filtered and cooled to a temperature of about 90° C. and pure crystalline sulphur precipitated therefrom with the yield of sulphur being about 98%. This crystalline sulphur was next worked and dried to obtain 99.9% pure sulphur.

*Example 4*

Fifty grams of sulphur bearing ore with a sulphur content of 31.8% was mixed with 150 grams of commercial kerosene heated to a temperature of 135° C. Upon mixing the mixture cooled to a temperature below 125° C. and then the temperature of the mixture was raised to 135° C. When the mixture reached 135° C., a liquid sulphur issued from the ore and was not absorbed by the solvent. This liquid sulphur quickly fell to the bottom of the vessel in which the extraction process was being carried out and there solidified to the vessel.

The purpose of this example is to show that at 135° C. an insoluble liquid sulphur is extracted from sulphur bearing material and is not absorbed by the solvent. As a result, the liquid sulphur quickly travels to the lower parts of the extraction apparatus and there tenaciously adheres to a surface of the vessel. For example, if 135° C. were used as the extraction temperature in the apparatus illustrated on the flow sheet, then this liquid sulphur would be deposited upon the vibrating screen assembly 44 and there, in a short time, effectively clog the screens and thus, materially reduce efficiency of the process or completely stop the process.

Example 5

Fifty grams of the same ore as used in the preceding example was mixed with 150 grams of the same kerosene solvent as used in the previous example. Prior to mixing, the solvent was heated to a temperature of 132° C. Immediately after mixing, the temperature of the mixture fell to about 125° C. and then the mixture was heated to 132° C. At 132° C., there was no liquid sulphur which was insoluble in the kerosene solvent extracted from the sulphur bearing ore and there was no deposit of any insoluble liquid sulphur on the bottom of the extracting vessel.

This example establishes that if the extraction step is carried out at a temperature of 132° C. and below, then there is not the formation of the insoluble liquid sulphur from the ore which then falls to the lower part of the apparatus and interferes with the process.

Example 6

One part by weight of a 31.8% sulphur bearing ore was placed in a perforated container and immersed in three parts by weight of kerosene and the mixture heated to a temperature of 140° C. and held at that temperature until all of the sulphur was separated from the ore. Shortly after immersion the mixture reached 140° C., molten sulphur flowed from the container and gravitated to the bottom of the vessel and there began to darken and became a black mess. Also, the remaining liquid darkened to a considerable extent and an evolution of hydrogen sulfide gas was detected from the vessel, thus indicating a chemical reaction between the sulphur and the kerosene.

The perforated container carrying the ore was then removed from the hot solvent and the hot solvent filtered while hot to separate any residue therein. The filtered hot solvent was cooled to approximately 70° C. whereupon crystalline sulphur precipitated therefrom, leaving a solvent having a yellowish-orange color.

The yellowish-orange color of the solvent left after filtration indicated that a chemical reaction had changed the character of the solvent and that before it could be recycled in the process, it would have to be treated. Thus, carrying out the extraction step at temperatures from 135° C. and higher and particularly at 140° C. and higher, not only produces an insoluble sulphur which interferes with practicing the process, but also causes a chemical reaction between the solvent and the sulphur and thus requires that the solvent be treated before its reuse in the process.

Example 7

This example illustrates the application of gasoline as a solvent in the presently described procedure.

The procedure of Example 1 was repeated, using gasoline having a boiling range of between 60 and 120° C. The extraction was carried out for 30 minutes at 100° C. The sulphur obtained was substantially pure sulphur melting at 112° C. The solvent loss was only 10% and the recovered solvent was clear and reusable in further extractions.

Example 8

This example illustrates the use of kerosene as a solvent in the presently described procedure.

The procedure of Example 1 was repeated, using kerosene having a boiling range of between 150 and 250° C. The extraction was carried out for 30 minutes at 105° C. The sulphur obtained was substantially pure sulphur melting at 112° C. The solvent loss was only 5% and the recovered solvent was clear and reusable in further extractions.

Example 9

This example illustrates the ues of diesel fuel in the presently described procedure.

The procedure of Example 1 was repeated, using diesel fuel having a boiling range of between 170 and 300° C. The extraction was carried out for 30 minutes at 120° C. The sulphur obtained was substantially pure sulphur melting at 112° C. The solvent loss was only 5% and the recovered solvent was clear and reusable in further extractions.

Example 10

This example illustrates the application of the presently described process to the extraction of sulphur from low grade sulphur ores.

The procedure was applied to a volcanic ore containing gypsum, limestone, and 20% sulphur. One-half pound of this ore was mixed with two pounds stove oil and the mixture heated for 30 minutes at 112–120° C. Thereafter the solution was separated from the residual ore and cooled below 70° C. for separation of the sulphur. The latter then was removed from the liquid by filtration and washed with a little water. It was substantially pure sulphur, i.e., 99.9%, melting at 112° C. The yield was 93% of the theoretical.

My process has certain advantages which make it highly desirable and particularly adapted for treating a number of wide variety sulphur bearing materials. It is particularly useful for extracting sulphur from spent oxides of gas works and from low grade sulphur bearing ores each of which may be contaminated with such chemicals as arsenic, ferrocyanide, tar, and other contaminants which previously were removed only with great difficulty and by expenditure of additional monies.

In addition, my process produces a sulphur which is substantially pure, 99.9% or higher, and is readily applicable to many major commercial uses. The sulphur recovered is in such pure form that it need not be further processed in order to remove undesirable impurities. A further advantage of my process is that it extracts sulphur in high yields. For example, it is not uncommon that the sulphur removed by my process comprises 98% of the sulphur in the sulphur bearing material.

A further advantage of my process is that the solvent used is not contaminated and has not been subject to chemical reaction and, therefore, can be recycled without treatment for removal of impurities.

While I have described certain preferred embodiments of my invention, it is to be understood that it may be otherwise embodied within the scope of the following claims.

I claim:

1. A process for extracting sulphur from material containing elemental sulphur which comprises treating the sulphur containing material with an aliphatic hydrocarbon solvent having from 7 to 18 carbon atoms to form a solution of the solvent and of the elemental sulphur, in said treating maintaining temperature of said material and said solvent between a minimum of 85° C. and a maximum of 132° C. separating the solution from the residual solid material, cooling the solution to a sulphur crystallizing temperature, and separating the sulphur from the cooled solution.

2. The process of claim 1 characterized by said sulphur containing material having a moisture content of less than 12% by weight.

3. The process of claim 1 characterized by prior to treating the sulphur containing material with the aliphatic hydrocarbon solvent, heating the sulphur containing material to a temperature between 85° C. and 110° C. and heating the solvent to a temperature between 85° C. and 132° C.

4. The process of claim 1 characterized by said solvent being gasoline.

5. The process of claim 1 characterized by said solvent being kerosene.

6. The process of claim 1 characterized by said solvent being stove oil.

7. The process of claim 1 characterized by said solvent being diesel fuel.

8. The process of claim 1 characterized by said solvent and said material having a ratio of solvent to material from 1:1 to 5:1.

9. A process for extracting sulphur from material containing elemental sulphur which comprises continuously treating the sulphur containing material with an aliphatic hydrocarbon solvent having from 7 to 18 carbon atoms to continuously form a solution of the solvent and of the elemental sulphur, in said treating maintaining temperature of said material and said solvent between a minimum of 85° C. and a maximum of 132° C. continuously separating the solution from the residual solid material, continuously cooling the solution to a sulphur crystallizing temperature, continuously separating the sulphur from the cooled solution and recycling the separated solvent with an additional quantity of material containing elemental sulphur.

10. A process for extracting sulphur from material containing elemental sulphur which comprises treating the sulphur containing material with an aliphatic hydrocarbon solvent having from 7 to 18 carbon atoms to form a solution of the solvent and of the elemental sulphur, in said treating maintaining temperature of said material and said solvent between a minimum of 120° C. and a maximum of 132° C. separating the solution from the residual solid material, cooling the solution to a sulphur crystallization temperature, and separating the sulphur from the cooled solution.

11. The process of claim 1 characterized by cooling the solution to a temperature of about 90° C.

12. The process of claim 9 characterized by continuously cooling the solution to a temperature of about 90° C.

References Cited in the file of this patent
UNITED STATES PATENTS

| | | |
|---|---|---|
| 166,279 | Johnson | Aug. 3, 1875 |
| 2,409,408 | Tweeddale | Oct. 15, 1946 |

FOREIGN PATENTS

| | | |
|---|---|---|
| 366,052 | Great Britain | July 25, 1930 |